INVENTOR
THEODORE B. HOLLIDAY
BY
ATTORNEYS

May 2, 1939.　　　　　T. B. HOLLIDAY　　　　　2,156,288
FLYING AUTOMOBILE
Filed May 4, 1937　　　　7 Sheets-Sheet 4

INVENTOR
THEODORE B. HOLLIDAY
BY John J. Howan
　　Clade Konty
　　　　ATTORNEYS

Patented May 2, 1939

2,156,288

UNITED STATES PATENT OFFICE 2,156,288

FLYING AUTOMOBILE

Theodore B. Holliday, Dayton, Ohio

Application May 4, 1937, Serial No. 140,666

26 Claims. (Cl. 244—50)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to automotive vehicles and more particularly to vehicles primarily designed for ground transportation; but which are capable of being readily converted into vehicles adapted for air transportion.

The prior art teaches the use of "auto-plane" types of vehicles which are primarily intended for transportation of passengers and/or cargo by air and consisting of an aerodynamically sustained body, steerable ground alighting means and propelling means.

One of the many problems confronting the general acceptance and use of the auto-plane types of airplane, now existing, resides in the fact that the sustaining surfaces or wings are mounted in such a manner that these normally laterally extending surfaces may be collapsed and folded into compact position longitudinally along the fuselage to permit passage of the airplane, when travelling on the ground, along roadways and the like, and to permit storing the airplane in spaces of a small size only sufficient to accommodate the fuselage and chassis with the wings and the empennage in folded position. In all such vehicles, air transportation has been the primary desideratum, ground travelling relegated to a secondary status, and desirable only to enable movement of the vehicle over the ground for no considerable distances, in taxiing to and from landing and terminal fields.

The facts, however, have been entirely overlooked, first that even today the average person travels distances in which air travel would be advantageous less than twenty percent of the time and that during even that period of time, an automobile would sometimes be an advantage, and second, that the average person is financially unable to consider ownership of two means of transportation, especially if the second mode of transportation is used only for trip travel, since it would be more convenient and more economical to make trips by automobile than to maintain a second vehicle especially designed for air travel only.

An object of this invention is to provide a duo-functional vehicle, adapted for use as a ground vehicle and as an aerial vehicle.

Another object of this invention is to provide demountable wings, empennage and propulsion means adapted for attachment to a ground vehicle to thereby convert it into an airplane.

Another object of this invention is to provide means of transportation wherein there is combined tasteful design, distinctive appearance, comfort, luxury and convenience of the modern automobile, with the additional speed attendant of air travel without sacrificing in the least the fundamental mechanical features or power and balance of either the automobile or the airplane, and wherein the combination and correlation of the vital parts of both vehicles endow the new means of transportation with added measures of safety.

Another object of this invention is to provide a ground vehicle primarily intended as an automobile, but which may be readily converted into a vehicle intended for air travel by the attachment of the necessary parts.

Another object of this invention is to provide a vehicle wherein the ground vehicle may be stored in automobile garages and attaching units necessary to its conversion into an aerial vehicle may be conveniently stored at an airport, or on a trailer which may be stored in the owner's home garage.

Another object of this invention is to provide a duo-functional vehicle in which the motor power or the power plant is located in the rear of the vehicle.

Another object of this invention is to provide means whereby the operator may quickly adjust the balance of the airplane before taking to the air.

Another object of this invention is to provide a duo-functional vehicle having a stream lined body of monocoque construction.

A further object of this invention is to provide a duo-functional vehicle wherein the running wheels of the ground vehicle may be retracted when converted into an aerial vehicle.

A still further object of this invention is to provide a duo-functional vehicle with a novel system of controls for steering the vehicle, both as a ground and as an aerial vehicle.

A still further object of this present invention is to provide in a ground vehicle means for elevating the wings when used as an airplane, so that the angle of incidence thereof may be varied to accommodate changed conditions.

Other objects and advantages reside in the construction of parts, the combination thereof and the mode of operation, as will become more apparent from the following description.

The present invention is addressed to a buying public having primary consideration for a means and/or mode of transportation wherein is combined the tasteful design, distinctive appearance, comfort, luxury and convenience of the modern automobile, while the additional speed attendant to air travel, without sacrificing in the least the fundamental mechanical features, or power and balance of either the automobile or the airplane, and wherein the combination and correlation of the vital parts of both vehicles endow the new means of transportation with added measures of safety.

The present invention aims to overcome the defects and objectional features above pointed out, and instead provide what may be termed a flying automobile, that is to say, an automotive vehicle primarily intended for operation as an automobile, but which may be converted readily into a vehicle intended for air travel by the ready attachment of the necessary parts. In so doing, the vehicle may be stored or parked in a small space, for example, in automobile garages. It may be driven under its own power to and from a landing field as a conventional ground vehicle. The attaching units necessary to its conversion into an aerial vehicle of transportation may be conveniently stored at the airport, wherein rental fees for the storage of this equipment would be nominal. These attaching units may be carried by trailer and stored at the owner's home. This overcomes the necessity for storing or parking the vehicle in the buildings originally provided adjacent the flying fields, usually located at a considerable distance from the locality in which the user resides.

Thus, the user may derive the benefits of both air travel and ground travel by one vehicle. For example, he may proceed by airplane to any desired locality, land at the air port, and by readily removing and storing the attaching units required in converting it from a vehicle of ground travel to one of air travel, proceed by automobile to any desired point and for any distance, the machine when so converted having every appearance of a modern automobile with its attendant comforts, conveniences and speed.

The power plant of the duo-functional vehicle is shown located in the rear thereof, although other locations may be used. Such positioning of the power plant is conducive to better balance of the machine, both when used for ground and air travel, and proper wing arrangement when used as an airplane, in that the passenger seats may be located at or near the center of pressure of the wings and the center of gravity of the airplane. It eliminates the necessity of the conventional torque tube drive shaft and thus permits of a considerable reduction in overall height. It permits ready access to the power plant for driving the propeller when the machine is converted into an airplane, without interfering with interior conveniences. It permits all operating parts to be wholly contained within the streamlining of the body to materially reduce parasite resistance and obtain fundamental aerodynamic cleanness. It affords a more efficient utilization of space for passengers and/or cargo and keeps the overall length within reasonable limits.

The ground vehicle may be readily converted into an airplane by attaching wings thereto, which are removably mounted, and by attaching a suitable propeller and rudder mechanism. These may be attached without the necessity of employing the services of skilled riggers. The power plant is used for driving the propeller to propel the vehicle in the air when used as an airplane and to drive the running wheels when used as a ground vehicle. The motor power may be applied to the running wheels and to the propeller separately when so desired, or simultaneously to enable the vehicle when converted into an airplane to be brought to its highest attainable taxiing speed in a minimum of space upon taking off. The supplemental power means being brought into play at this point to provide the necessary additional propeller thrust for the take-off, it is obvious that only a slight additional expenditure of power will suffice to accomplish the take-off when the vehicle has already attained a fairly high taxiing speed.

The wheels are preferably retractable, so as to be withdrawn into the body when the vehicle is used as an airplane. The system of controls used for controlling the vehicle as a ground vehicle is also used for controlling the vehicle as an airplane, that is, the same steering wheel is used for the vehicle when used as a ground vehicle and when used as an airplane.

Ground vehicle chassis

The design and construction of the body follows the monocoque or semi-monocoque type. The body consists of a plurality of bulkheads 10, 12 and 14. These bulkheads are held in fixed spaced relation by longérons or ribs 16. The bulkheads are also held in fixed spaced relation by a sheet metal covering 18 spot-welded or otherwise secured in position. The forward end of the body may contain the usual windshield 20 and a nose 22 enclosing the controls, which will be described more fully later. This is an aerodynamically desirable shape.

Each of the bulkheads may include a substantially channel-shaped member 24 formed into arcuate formation extending continuously around the periphery of the body. This channel-shaped member 24 may be attached to a suitable sheet metal member 26 by rivets 28 or by spot-welding.

The lining 30 of the body is preferably supported in any suitable manner by the bight of the channel-shaped member 24. A sheet metal plate 32 extends across the entire opening bounded by the channel-shaped member 24 of the bulkhead 14. This sheet metal member 32 constitutes a rear wall of the passenger compartment of the body. The body contains two seats 34 and 36 in the modification shown. The number of seats may be changed to meet the requirements of the vehicle.

Engine mounting

The rear portion of the body tapers and forms a compartment 50 housing the engine 52, which is mounted near the rear axle of the ground vehicle. The transmission box 54 houses suitable gearing mechanism rotating a vertically disposed shaft 56 extending upwardly therefrom, for driving the propellers, which will appear more fully later, and a downwardly extending shaft 58, for propelling the rear wheels 60 when the vehicle is used for transportation on the ground. A splined connection is used between the gear box 54 of the engine and the axle of the wheels. This splined connection permits a relative movement between the body of the ground vehicle and the wheels, thereby providing flexibility, so that shocks may be absorbed between the wheels and the body of the ground vehicle. In addition thereto, the wheels are mounted for retraction, so as to reduce wind resistance. When the wheels are in retracted position a very slight clearance is left between the ground and the body of the vehicle.

The radiator 53 is preferably located below the engine. In order to provide ventilation for the radiator, louvers 55, preferably adjustably mounted, are located in the bottom floor 18 of the chassis. The louvers may be opened and closed at the option of the operator.

Individual wheel suspension

Figure 13:
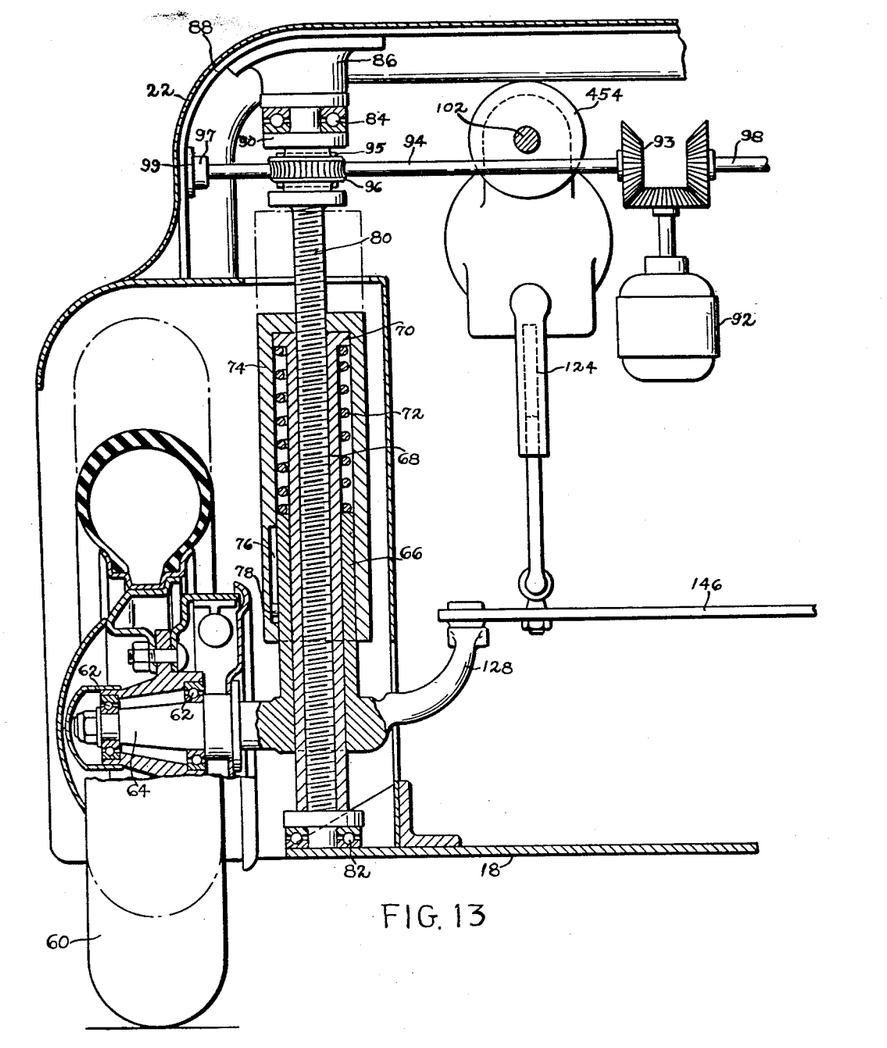
Fig. 13 discloses a sectional view of the individual suspension of one of the front wheels.

Referring to the disclosure in Fig. 13, the individual suspension of one of the front wheels has been shown. The wheel 60 is supported upon roller bearings 62, the inner race of which is mounted upon a spindle 64 integral with a tubular sleeve 66. The sleeve 66 is mounted upon an internally threaded quill 68 provided with a shoulder 70 at its upper end. A suitable shock absorbing spring 72 is interposed between the shoulder 70 and the upper end of the sleeve 66. The sleeve 66 may have free movement on the quill 68. A cap 74 encloses the upper end of the sleeve 66, the spring 72 and the upper portion of the quill 68. The cap 74 is provided with a longitudinal slot 76 into which a pin 78 projects. The pin 78, being fixedly attached to the sleeve 66, prevents rotation of the cap 74 and also limits the downward movement of the sleeve 66 and the parts carried thereby, including the wheel 60.

The quill 68 is mounted upon a screw threaded rod 80 having one end journalled in the end thrust bearings 82 supported upon a suitable plate 18, constituting the floor of the body. The other end is mounted in end thrust bearings 84 abutting a support 86 suspended upon a member 88 encircling the nose of the ground vehicle and simulating a bulkhead. A suitable collar 90, either integral or fixedly attached to the screw threaded rod 80, forms an abutment upon the rod for engagement with the bearing 84. Thus, it is seen that the entire weight suspended upon the wheel 60 is carried by the rod 80. As the rod 80 is rotatably mounted, the relative position of the wheel with respect to the body may be adjusted by closing a circuit through a motor 92 rotating a shaft 94 through beveled gears 93. The shaft 94 carries a worm 95 engaging a worm gear 96 fixedly attached to the rod 80. The end of the shaft 94 is preferably journalled in a bearing 97 carried by member 99. The other journals for the shaft and supports for the motor have not been shown.

Both of the front wheels are adjusted simultaneously as the shaft 98 adjusts the right wheel, which has not been shown in Fig. 13.

Figure 15:
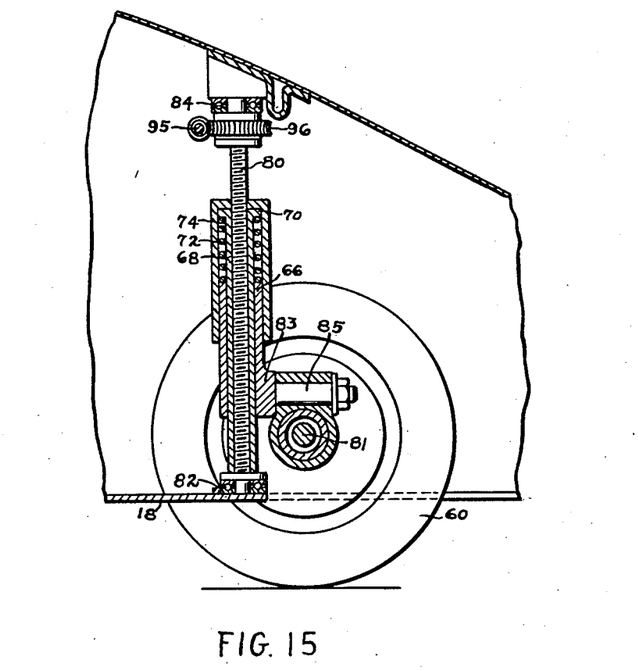
Fig. 15 discloses a cross sectional view taken substantially on the line 15—15 of Fig. 14.

In the front wheel individual suspension the screw shaft 80 and the parts carried thereby are concentrically mounted with respect to the longitudinal axis of the front wheel, that is, the longitudinal axis of the front wheel interconnects the longitudinal axis of the screw threaded shaft 80 and the parts carried thereby. In the mounting of the rear wheels, the longitudinal axis of the threaded rod 80 is offset with respect to the axis 81 of the rear wheel, as may best be seen by referring to Fig. 15. This has been accomplished by mounting a boss 83 merging into a stud 85 for interconnecting the quill 68 to the rear wheels. In other respects the individual suspension of the rear wheels is much the same as of the front wheels, excepting both of the rear wheels must be adjusted in unison in order to have the proper alignment.

Steering gear for ground vehicle

The steering gear for the ground vehicle includes a steering wheel 100 fixed to a shaft 102 extending through a tubular support 104 adjustably attached to a dash 106 of the body. The forward end of member 104 extends underneath the cowl. The shaft 102, as may be best seen from the schematic showing in Fig. 12, supports a pinion 108 meshing with a pivotal gear 110 keyed to a shaft 112. This shaft supports a second bevel gear 114, meshing with a pinion 116 mounted upon a shaft 118. This shaft supports a worm 120, meshing with a worm gear 122, actuating a crank arm 124. The crank arm is pivotally attached to a link 126, actuating the arm 128, causing the front wheel 60 to rotate about the pivot 68, so as to direct the ground vehicle. Thus, it will be seen that upon rotation of the wheel 100, the shaft 102 rotates and with it shafts 112 and 118 which drive or rock the arm 124, thereby actuating the arm 128 through the link 126. This controls one wheel.

Figure 12:
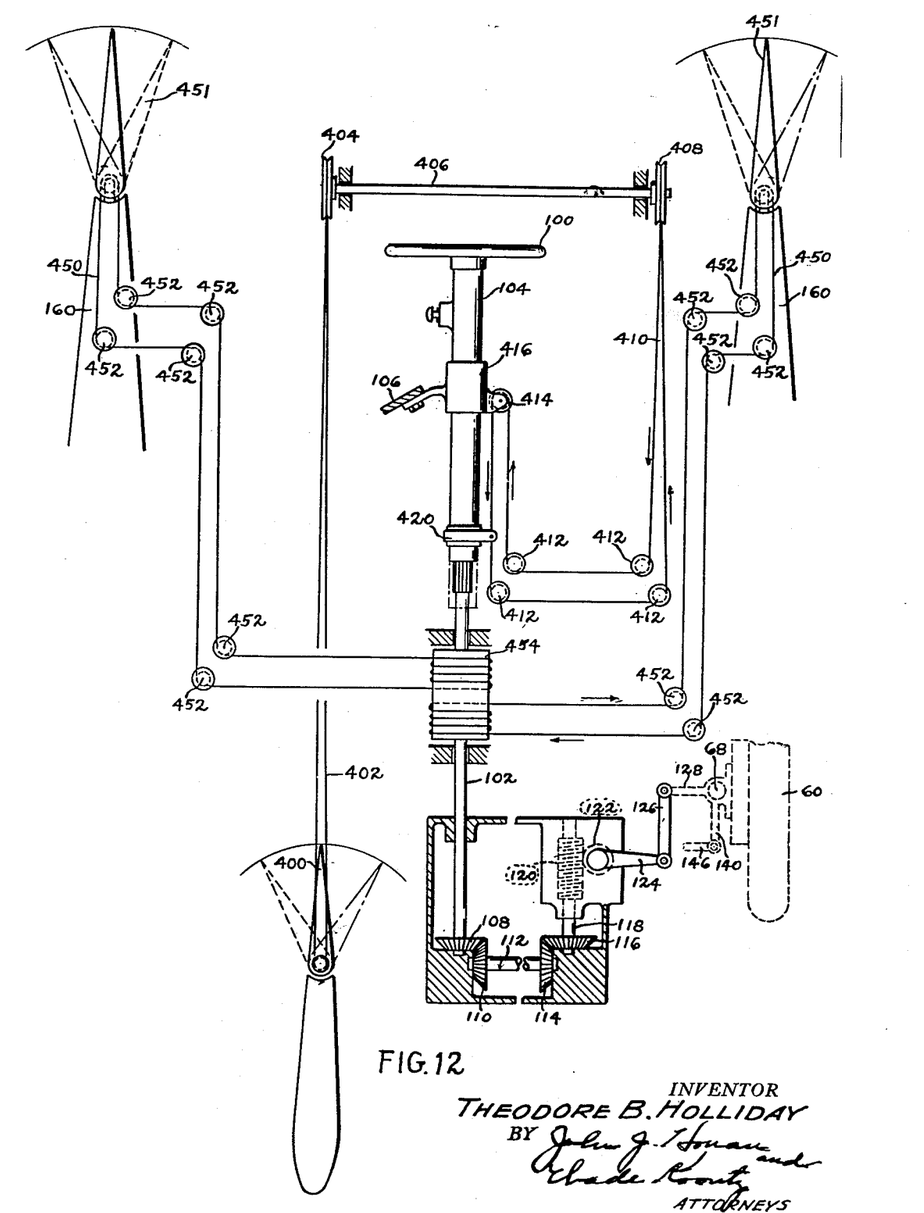
Fig. 12 is a schematic view illustrating the control mechanism for the duo-functional vehicle.

The other wheel is controlled by an arm 140 actuating a cross arm 146, extending across the ground vehicle so as to swing the opposite wheel in unison with the wheel 60, as is well known to those skilled in the art. The steering wheel 100 may also be used for controlling the vehicle when it functions as an airplane rather than a land vehicle, as will appear more fully later.

Wing suspension

The vehicle thus far described is primarily a land vehicle and simulates a conventional automobile. It may be converted into a heavier than air aircraft by mounting the necessary airplane members such as wings, ailerons, or rudders, elevators and propeller.

Figures 6, 8:
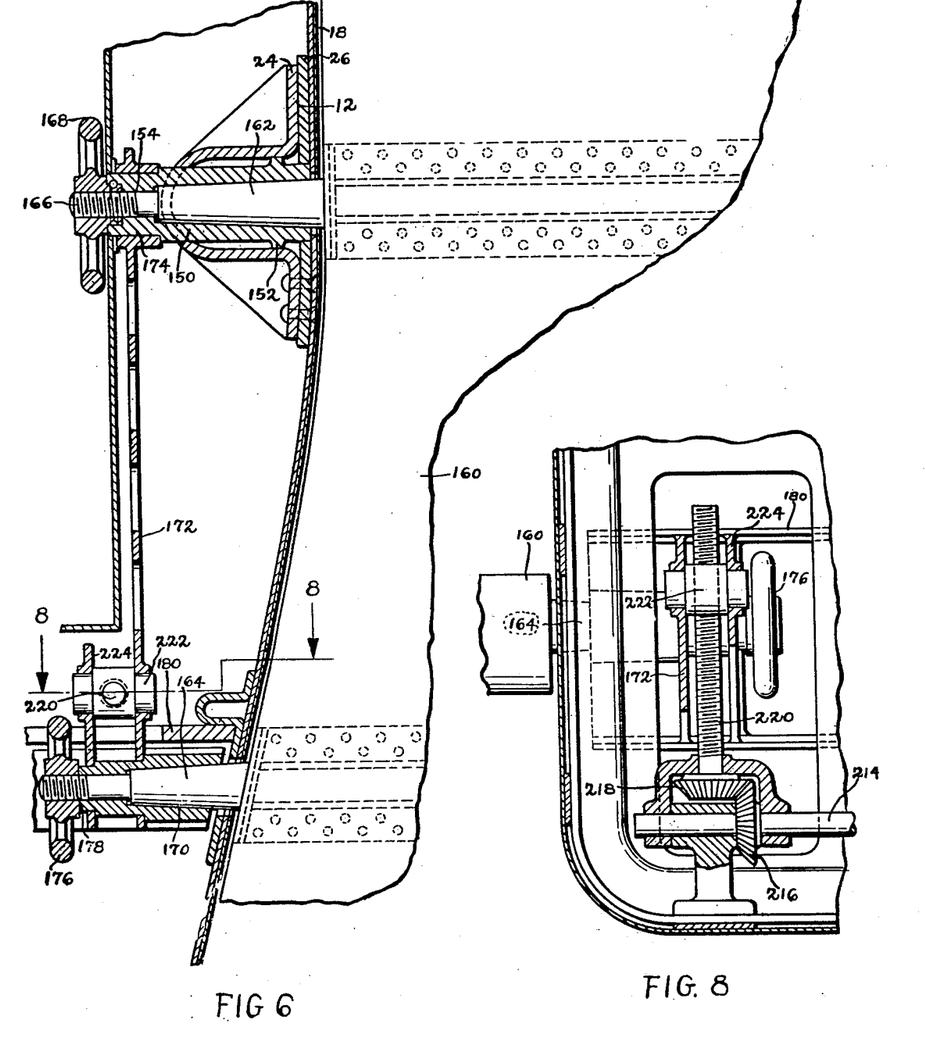
Fig. 6 is a fragmentary sectional view taken substantially on the line 6—6 of Fig. 1.
Fig. 8 is a sectional view taken substantially on the line 8—8 of Fig. 6.

The bulkhead 12 is provided with a pair of sockets or tapering bearings 150 mounted in the channel-shaped member 24 and suitably attached thereto, as by welding, at 152. One bearing is located on one side of the bulkhead, the other on the opposite side. Each of these bearings is provided with a reduced bore 154. Each wing 160 is provided with a pair of tapering pintles 162 and 164, the pintle 162 being mounted in one of the bearings 150. This pintle 162 terminates in a cylindrical stud 166 passing through the cylindrical bore 154 and held in position by a nut 168. The pintle 162 is suitably attached to the wing structure 160. The pintle 164 is mounted in a bushing 170 mounted in an arm 172 pivotally mounted on the periphery of the bearing 150, that is, upon a cylindrical portion 174. The pintle 164 is held in place by a suitable nut 176 threadedly engaging the reduced portion 178. The bearing 170 and the end of the arm 172 are suitably secured to a channel beam or a fabricated beam 180 extending transversely across the body of the vehicle to the rear of the partition 32. The angle of incidence of the wings 160, one mounted on each side of the vehicle, may be changed by rotating a hand wheel 200 fixedly attached to the shaft 202 having keyed thereto a pinion 204 meshing with a bevelled gear 206. The bevelled gear 206 is keyed to the end of the shaft 208 provided with a pinion 210 upon the opposite end. The pinion 210 meshes with a bevelled gear 212 mounted upon a transverse shaft 214. As may best be seen from Fig. 8, the shaft 214 carries a pinion 216 meshing with a bevelled gear 218 keyed to a threaded shaft 220, threadedly engaging a nut 222 mounted in the arm 172 and in a bracket 224. As the wheel 200 is rotated, it actuates the screw 220, so as to raise or lower the rear pintle of each wing, thereby changing the angle of incidence.

The angle of incidence of the wings may be adjusted electrically by a suitable electric motor or hydraulically by a suitable hydraulic piston.

*Propeller mounting*

When the device is used as a ground vehicle, the engine or power plant 52 drives the rear wheels much the same as in a conventional automobile, excepting the engine is mounted in the rear. When the device is used as an airplane it may be propelled by a propeller mechanism mounted on the empennage 300, shown in Fig. 1.

The empennage 300 is integral with a cap 301 which snugly fits the dome or the turret of the body of the ground vehicle. The cap portion of the empennage is so shaped that when the empennage is attached to the top of the body of the ground vehicle, the cap portion cooperates with the exposed portion of the body of the ground vehicle, to form a continuous streamlined effect, thereby reducing air resistance. The empennage and the cap are removably attached to the top or turret of the body of the ground vehicle. As may best be seen by referring to Fig. 7, the propeller has been mounted at the rear end of the empennage, that is, a pusher type of propeller has been used. The propeller, of course, could be mounted on the opposite end and the elevator mounted on the rear end, if so desired.

Figures 9, 10, 11, 14:
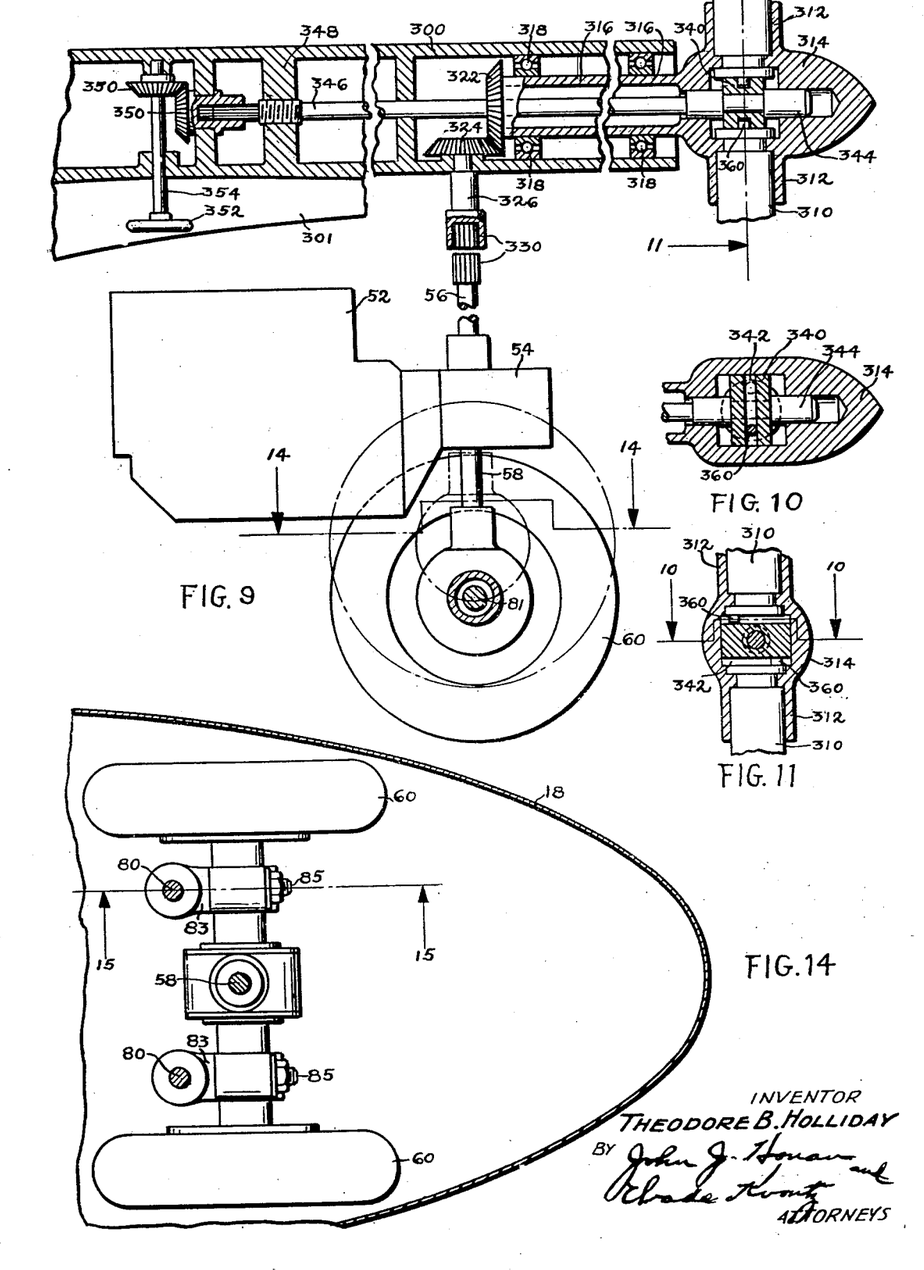
Fig. 9 is a cross sectional view of the propeller mechanism, showing the connection thereof to the power plant.
Fig. 10 is a fragmentary sectional view of the hub of the propeller, taken substantially on the line 10—10 of Fig. 11.
Fig. 11 is a fragmentary sectional view of the propeller taken substantially on the line 11—11 of Fig. 9.
Fig. 14 discloses a sectional view of the rear wheel suspension taken substantially on the line 14—14 of Fig. 9.

The propeller blades 310 have their inner ends which are cylindrical mounted in a tubular projection 312 integral with the hub 314. The hub 314 is integral with a tube 316 rotatably mounted in roller bearings 318 mounted in a housing or empennage 300. This housing 300 is fixedly attached to the body of the vehicle along the top thereof, as may be clearly seen in Fig. 1. The tubular sleeve 316 carries a pinion 322 meshing with a bevelled gear 324 keyed to a shaft 326. The shaft 326 is provided with a splined coupling 330 connecting it to the shaft 56 driven from the engine 52. The shaft 56 may be disconnected from the shaft 326 by separating the members constituting the splined coupling 330, as shown in Fig. 9.

Figure 1:
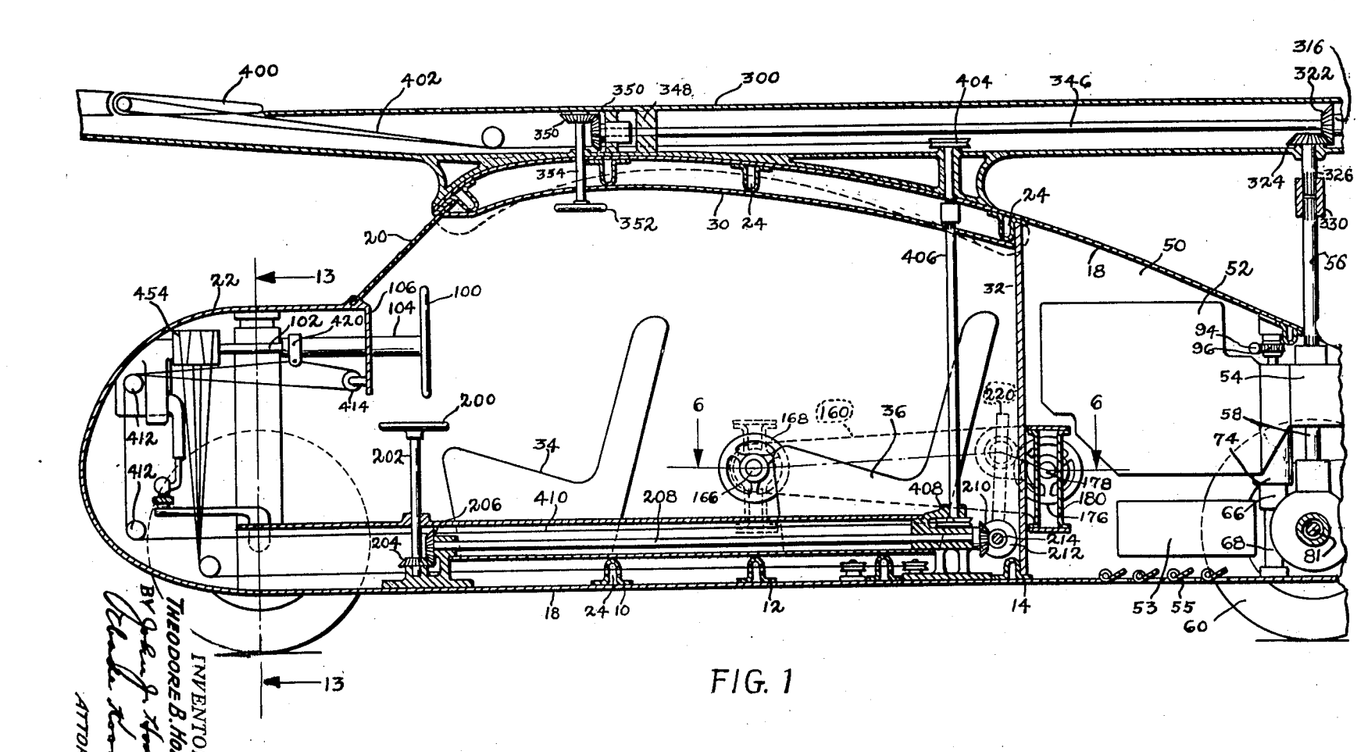
Fig. 1 discloses a longitudinal sectional view of the duo-functional vehicle.
Figure 2:
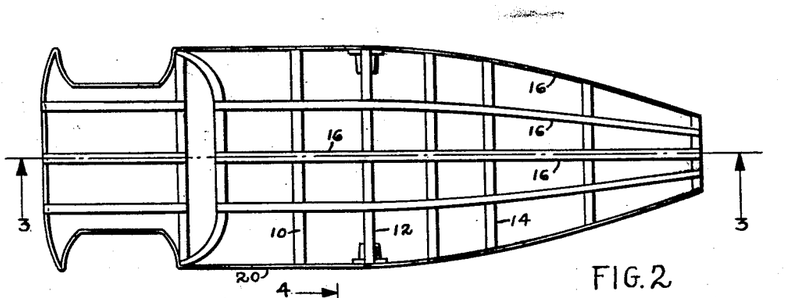
Fig. 2 discloses a top plan view of the chassis before being covered.
Figure 3:
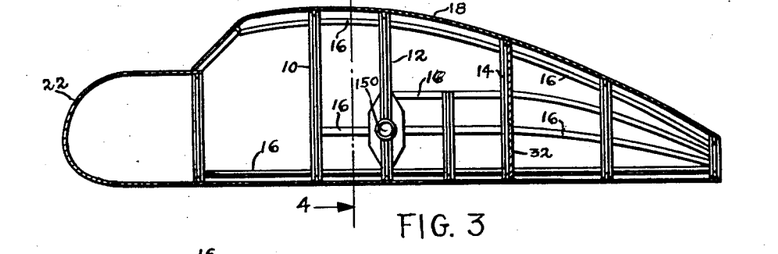
Fig. 3 discloses a longitudinal sectional view of the chassis taken substantially on the line 3—3 of Fig. 2, but showing the covering in place.
Figure 4:
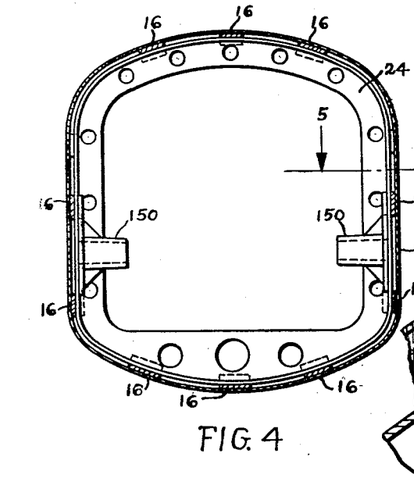
Fig. 4 is a cross sectional view taken substantially on the line 4—4 of Fig. 3, so as to show the bulkhead construction.
Figure 5:
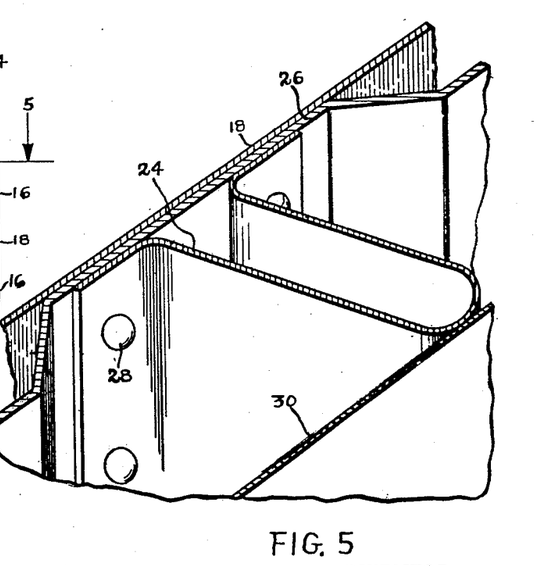
Fig. 5 is a fragmentary perspective cross sectional view of the bulkhead taken substantially on the line 5—5 of Fig. 4.

Within the hub 314 is located a collar 340 provided with a pair of grooves 342. The collar 340 is rotatably mounted upon the stationary shaft 344 mounted for longitudinal adjustment with respect to the hub 314. This adjustment is accomplished by the forwardly extending portion 346 of the shaft 344 threadedly engaging a diaphragm 348 within the housing 300 and rotated at the will of the operator through the bevelled gears 350, one of which is connected to a hand wheel 352 through a shaft 354. The hand wheel 352, as may best be seen in Fig. 1, is located within reach of the operator of the vehicle.

Eccentric studs 360 integral or fixedly attached to the inner ends of the propeller blades 310 project into the grooves 342 found in the collar 340. As the collar 340 is actuated to the right or to the left, as viewed in Fig. 9, the pitch of the blades is adjusted, that is, the pitch of the blades may be increased or it may be decreased, depending entirely upon the direction through which the shaft 344 is actuated.

*Controls*

In an airplane at least two types of controls are required, one controlling the angle of incidence of the plane and the other the direction of flight.

The forward end of the housing or empennage 300 supports an elevator 400, which controls the angle of incidence of the plane, or the vertical direction of movement thereof. The elevator, as best seen in the schematic view in Fig. 12, is rotated or raised and lowered by the cables 402 drawn over a pulley 404 fixedly attached to the vertical shaft 406, as best seen in Fig. 1. The shaft 406 is suitably journalled to the chassis of the vehicle and is provided with a pulley 408 at the lower end, as viewed in Fig. 1. A cable 410 drives the pulley 408 and passes over two pairs of pulleys 412 located in the front end of the vehicle. Finally, the cable 410 passes over a pulley 414 fixedly attached to the chassis of the ground vehicle by a bracket 416 and the cable is clamped to the tubular sleeve 104 by a bracket 420. The operator of the airplane may control the angle of incidence or the vertical direction of flight by reciprocating the steering wheel 100 forwardly and rearwardly, as the case may be, so as to shift or control the vertical course of the airplane.

In addition to the elevators for controlling the vertical direction of the airplane, controls also must be provided to adjust the direction of flight in a horizontal plane. In the present modification this is accomplished by rudders adjustably attached to the wings 160 or mounted in any other suitable manner. The rudders 451 have not been shown in the wings, as such a structure is well known to those skilled in the art; but are shown schematically in Fig. 12. Each rudder is controlled by a cable 450 passing over the pulleys 452 and wound about a drum 454. This drum is fixedly attached to the shaft 102 and is rotated in either direction by the steering wheel 100. Thus, as the steering wheel is rotated in one direction, the rudder on that wing tends to increase the drag and spoil the lift thereof. If the steering wheel is rotated in the opposite direction, the controls perform the same operation on the opposite wing. Thus, it is seen that the steering mechanism serves a duo-function, in that it controls the vehicle on the ground by steering the front wheels and it controls the airplane through the elevator and the rudders 451 shown schematically in Fig. 12.

*Changing the duo-functional vehicle from an airplane to a ground vehicle, or vice versa*

By shedding the empennage of the vehicle, that is, by shedding the propeller support and by removing the wings by merely unscrewing members 168 and 176, the chassis may be used as a ground vehicle. The wings, the propeller and the associated structure may be stored at the hangar at the air field, at which time the vehicle may be used as a ground vehicle or automobile, it simulating the conventional automobile in appearance. By providing suitable louvers or doors for the openings in the sides and the top of the body of the vehicle, the holes receiving the pintles 162 and 164 and the holes associated with the empennage may be hidden from view when the vehicle is used as a ground vehicle. Thus, it may be seen that the same vehicle may be used both on the ground as an automobile, and in the air as an airplane, it merely being necessary when converting the vehicle from one to the other to either add or take off the wings and empennage.

Figure 7:
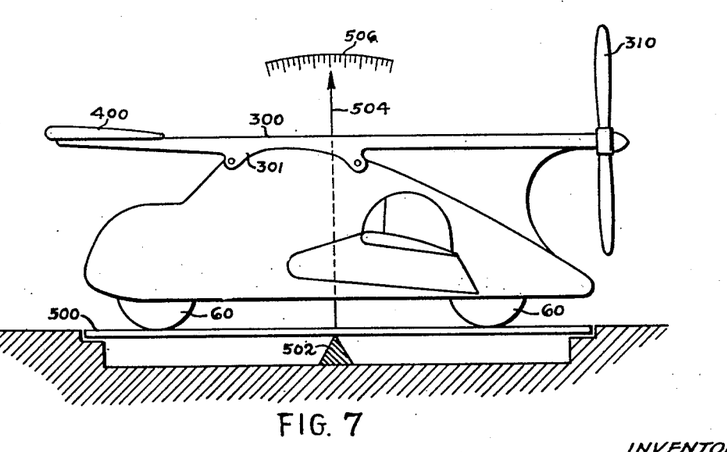
Fig. 7 is a schematic view of a balancing mechanism.

The ground vehicle having the wings and the empennage added thereto may be balanced upon a suitable balancing mechanism shown in Fig. 7. It is quite essential, especially in the tailless type airplanes, that the weight be very carefully balanced within the plane. By utilizing the balancing mechanism disclosed in Fig. 7, the load intended to be carried in the airplane may be distributed so as to secure the proper balance, in which event, the pointer will move into a vertical position. By properly balancing the load, the stability of the airplane in flight is greatly enhanced.

The balancing device shown in Fig. 7 has been shown schematically and consists broadly of a platform 500 fulcrumed at 502 and interconnected to a suitable indicator or pointer 504 arranged to register with indicia 506. Whenever the load is properly balanced on the vehicle, the pointer 504 will assume a vertical direction in the modification disclosed. The pointer 504 may be connected through suitable mechanism on the platform 500 so as to properly register the degree of unbalance.

Although the preferred modification of the device has been described, it will be understood that within the purview of this invention various changes may be made in the form, details, proportion and arrangement of parts which generally stated consist in a device capable of carrying out the objects set forth, in the novel parts, combination of parts and mode of operation, as disclosed and defined in the appended claims.

Having thus described my invention, I claim:

1. In a duo-functional vehicle adaptable for use either as a ground vehicle simulating a conventional automobile or as an airplane by removably attaching wings to the body of the ground vehicle, the combination including a closed bulkhead vertically disposed in the body of the ground vehicle and bearings fixedly attached on the bulkhead for pivotally supporting the wings.

2. In a duo-functional vehicle adaptable for use either as a ground vehicle or as an airplane by removably attaching wings to the ground vehicle simulating an automobile, the combination of a body, a bulkhead constituting a portion of the frame structure of the body of the ground vehicle, with a pair of bearings mounted on the bulkhead, a second pair of bearings mounted in spaced relation from the first pair of bearings, and pintles mounted on the wings, said pintles being mounted in said bearings for attaching the wings to the body of the ground vehicle.

3. In a duo-functional vehicle adapted for use either as a ground vehicle or as an airplane by removably attaching wings to the body of the ground vehicle simulating an automobile, the combination including a bulkhead for the body of the ground vehicle, said bulkhead having a channel-shaped member extending continuously throughout the periphery of the bulkhead, the bight of the channel projecting inwardly so that the channel opens outwardly, a pair of supporting members fixedly mounted on the bulkhead, a pair of fitting members fixedly mounted on the wings, said fitting members adjustably interengaging the supporting members, and means for interconnecting the fitting members to the supporting members so as to removably attach the wings to the body of the ground vehicle to convert it into an airplane.

4. In a duo-functional vehicle adapted for use either as a ground vehicle or as an airplane by removably attaching wings to the body of the ground vehicle simulating an automobile, the combination including a bulkhead in the body of the ground vehicle, a pair of bearings fixedly mounted on the bulkhead, a second pair of bearings adjustably mounted in spaced relation from the first pair of bearings, a pair of pintles fixedly mounted on each of the wings, said pintles being seated in the bearings, and means for adjusting said second pair of bearings so as to vary the angle of incidence of the wings when the vehicle is used as an airplane.

5. In a duo-functional vehicle adapted for use either as a ground vehicle or as an airplane by removably attaching wings to the body of the ground vehicle simulating an automobile, the combination including a pair of bearings fixedly mounted on the body of the ground vehicle, a second pair of bearings adjustably mounted in spaced relation from the first pair of bearings, a rocker arm for supporting the second pair of bearings, said rocker arm being pivotally mounted upon the first pair of bearings, a pair of pintles mounted on each wing, one of said pintles being journalled in the fixed bearing and the other in the adjustable bearing, said pintles terminating a short distance beyond the inside of the outer wall of the body of the ground vehicle, means for securing the pintles in position, and means for adjusting the rocker arm so as to change the angle of incidence of the wings when the vehicle is used as an airplane.

6. In a duo-functional vehicle adapted for use either as a ground vehicle or as an airplane by removably attaching wings to the body of the ground vehicle simulating an automobile, the combination including a pair of bearings fixedly mounted on the body of the ground vehicle, a second pair of bearings adjustably mounted in spaced relation from the first pair of bearings, a pair of rocker arms for supporting the second pair of bearings, said rocker arms being pivotally mounted upon the first pair of bearings, a pair of pintles mounted on each wing, one of said pintles being journalled in the fixed bearing and the other in the adjustable bearing, said pintles terminating a short distance beyond the inside of the outer wall of the body of the ground vehicle, means for securing the pintles in position, and means including an adjusting screw for adjusting and holding the rocker arm in any adjusted position so as to fix the angle of incidence of the wings when the vehicle is used as an airplane.

7. In a duo-functional vehicle adapted for use either as a ground vehicle or as an airplane by removably attaching wings to the body of the ground vehicle simulating an automobile, the combination including a pair of bearings fixedly mounted on the body of the ground vehicle, a second pair of bearings adjustably mounted in spaced relation with respect to the first pair of bearings, a trussed member mounted within the wall of the body of the ground vehicle along the side of the seating compartment for interconnecting said second pair of bearings, a pair of pintles for each wing and fixedly attached thereto, said pintles being removably mounted in the bearings, one pintle in the fixed bearing and the other pintle in the adjustable bearing, said pintles terminating a short distance beyond the inside of the outer wall of the body of the ground vehicle, means for securing the pintles in position, and means for adjusting the adjustable bearings in unison, the trussed member moving with the adjustable bearings so as to adjust the angle of incidence of the wings when the vehicle functions as an airplane.

8. In a duo-functional vehicle adapted for use either as a ground vehicle or as an airplane by removably attaching wings to the body of the ground vehicle simulating an automobile, the combination including a pair of fixed bearings mounted on the body of the ground vehicle, a pair of adjustable bearings mounted in spaced relation with respect to the fixed bearings, a pair of rocker arms mounted within the wall of the body of the ground vehicle along the side of the seating compartment for supporting the adjustable bearings and pivotally mounted upon the fixed bearings, a pair of pintles fixedly attached to each of the wings, one of the pintles being seated in the fixed bearing and the other in the adjustable bearing, said pintles terminating a short distance beyond the inside of the outer wall of the body of the ground vehicle, means for securing the pintles in position, and means for adjusting the rocker arms in unison and equally so as to vary the angle of incidence of the wings when the vehicle is used as an airplane.

9. In a duo-functional vehicle adapted for use either as a ground vehicle simulating an automobile, said ground vehicle having wheels constructed and arranged to be driven from an engine mounted in said ground vehicle, or as an airplane by removably attaching a pair of wings to the ground vehicle, the combination including means for removably attaching the pair of wings to the sides of the body of the ground vehicle, said means being adjustable so as to change the angle of incidence of the wings, a demountable empennage rigidly attached to the body of the vehicle, said empennage having a guiding member mounted at one end and a propeller mounted at the other end thereof and control means extending from the empennage through the body of the ground vehicle within reach of the pilot for controlling the airplane.

10. In a duo-functional vehicle adapted for use either as a ground vehicle simulating an automobile, said ground vehicle having wheels constructed and arranged to be driven from an engine mounted in said ground vehicle, or as an airplane by removably attaching a pair of wings to the ground vehicle, the combination including means for individually and removably attaching the pair of wings to the sides of the body of the ground vehicle, said means being adjustable so as to change the angle of incidence of the wings, an empennage having a cap portion embracing and snugly fitting the top of the body of the ground vehicle, said empennage and cap being removably mounted and supporting a propeller at one end and a guiding member at the other end so as to convert the ground vehicle into an airplane, and a shaft extending downwardly from the empennage into the body of the ground vehicle for controlling the movement of the airplane.

11. In a duo-functional vehicle adapted for use either as a ground vehicle simulating an automobile, said ground vehicle having wheels constructed and arranged to be driven from an engine mounted in said ground vehicle, or as an airplane by removably attaching a pair of wings to the ground vehicle, the combination including means for removably attaching the pair of wings to the sides of the body of the ground vehicle, said means being adjustable so as to change the angle of incidence of the wings, an empennage including a cap portion snugly fitting the top of the body of the vehicle, said empennage being removably mounted and supporting a propeller at the rear end and ailerons at the forward end, and a drive shaft for the propeller extending downwardly from the empennage into the body of the ground vehicle.

12. In a duo-functional vehicle adapted for use either as a ground vehicle simulating an automobile having a rear engine drive or as an airplane by removably attaching a pair of wings to the ground vehicle, the combination including means for removably attaching the pair of wings to the sides of the body of the ground vehicle, said means being adjustable so as to change the angle of incidence of the wings, and an empennage removably mounted to the top of the ground vehicle, a propeller supported by said empennage, and driving means for the propeller, said driving means including a shaft driven from a vertical shaft extending through the rear of the body of the ground vehicle and driven from the engine within the ground vehicle.

13. In a duo-functional vehicle adapted for use either as a ground vehicle simulating an automobile having a rear engine drive or as an airplane by removably attaching a pair of wings to the ground vehicle, the combination including means for removably attaching the pair of wings to the sides of the body of the ground vehicle, said means being adjustable so as to change the angle of incidence of the wings, and an empennage removably attached to the body of the ground vehicle, said empennage supporting a propeller at one end and ailerons at the other end, driving means including a drive shaft for driving the propeller extending through the rear of the body of the ground vehicle and driven from the engine in the ground vehicle, and means for changing the pitch of the propeller blades, said means including a control member extending through the body of the ground vehicle and terminating in reach of the operator of the vehicle.

14. In a duo-functional vehicle adapted for use either as a ground vehicle or as an airplane by removably attaching a pair of wings to the ground vehicle, the combination including a plurality of wheels for supporting the body portion and means for mounting the wheels individually, said means including a tubular member surrounding a pair of telescoping members, a capping member mounted to enclose one of the telescoping members and said tubular member, means cooperating with said tubular member and the capping member for limiting the relative movement thereof, and a device for adjusting the relative position of said telescoping members so as to change the relative height of the body with respect to the wheels.

15. In a duo-functional vehicle adaptable for use either as a ground vehicle or as an airplane by removably attaching wings to the body of the ground vehicle simulating an automobile, the combination including a closed bulkhead vertically disposed in the body of the ground vehicle, supporting members mounted on the bulkhead, and means on the wings adapted for removable attachment to the supporting members for removably attaching the wings to the body of the ground vehicle.

16. In a duo-functional vehicle adaptable for use either as a ground vehicle or as an airplane by removably attaching wings to the body of the ground vehicle simulating an automobile, the combination including a bulkhead in the body of the ground vehicle, wing supporting members mounted on the sides of the bulkhead, and means fixedly attached to the wings for removably attaching the same to the supporting members of the bulkhead so as to convert the vehicle from a ground vehicle to an airplane.

17. In a duo-functional vehicle adaptable for use either as a ground vehicle having a body terminating in a dome-shaped top portion or as an airplane by removably attaching wings to the body of the ground vehicle having a source of power, the combination including an empennage removably attached to and snugly fitting the dome of the top of the vehicle, a propeller mounted at one end of the empennage, an elevator mounted at the other end of the empennage, and driving means for interconnecting the propeller to said source of power, said driving means including a shaft extending downwardly from the empennage and releasably interconnected to the source of power.

18. In a duo-functional vehicle adapted for use either as a ground vehicle simulating an automobile, said ground vehicle having wheels constructed and arranged to be driven from an engine mounted in said ground vehicle, or as an airplane by removably attaching a pair of wings to the ground vehicle and removably attaching an empennage to the top of the body of the ground vehicle so as to convert the ground vehicle into an airplane, the combination including means for individually and removably attaching wings to the sides of the body of the ground vehicle and means for adjusting the angle of incidence of the wings, said means being housed within the body of the ground vehicle and positioned along the side of the seating compartment.

19. In a duo-functional vehicle adapted for use either as a ground vehicle simulating an automobile having a body terminating in a dome-shaped top portion and having a rear engine drive or as an airplane, by removably attaching wings to the body of the ground vehicle, the combination including an empennage having a cap member snugly fitting the dome of the top of the ground vehicle, a propeller mounted on one end of the empennage, an elevator mounted on the other end of the empennage, and releasable driving means for interconnecting the propeller to the engine, said driving means projecting downwardly to the rear of the seating compartment of the body of the ground vehicle.

20. In a duo-functional vehicle adapted for use either as a ground vehicle having a body terminating in a dome-shaped top portion or as an airplane by removably attaching wings to the body of the ground vehicle having a source of power, the combination including an empennage removably attached to and snugly fitting the dome of the top of the vehicle, a propeller mounted at one end of the empennage, said propeller having adjustable blades whereby the pitch of the propeller blades may be adjusted, a tubular driving member journalled in the empennage for driving the propeller, a control shaft extending through the tubular driving member for changing the pitch of the empennage blades, adjusting means extending from the empennage through the top of the ground vehicle for actuating said control shaft, and driving means for interconnecting the tubular driving member to the engine, said driving means including a shaft extending downwardly from the empennage and releasably interconnected to the engine.

21. In a duo-functional vehicle adapted for use either as a ground vehicle having a body terminating in a dome-shaped top portion or as an airplane by removably attaching wings to the body of the ground vehicle having a source of power, the combination including an empennage removably attached to and snugly fitting the dome of the top of the ground vehicle, a propeller mounted at one end of the empennage, a tubular driving member journalled in the empennage for actuating the propeller, the blades of the propeller being adjustably mounted whereby the pitch of the propeller blades may be varied, control means extending through the tubular driving member and projecting through the top of the body of the vehicle for adjusting the pitch of the propeller blades, and driving means for interconnecting the propeller to said source of power, said driving means including a shaft extending downwardly from the empennage and releasably interconnected to the source of power.

22. In a duo-functional vehicle adapted for use either as a ground vehicle having a body terminating in a dome-shaped top portion or as an airplane by removably attaching wings to the body of the ground vehicle having a source of power, the combination including an empennage removably attached to and snugly fitting the dome of the top of the ground vehicle, a propeller mounted at one end of the empennage, a tubular driving member journalled in the empennage for actuating the propeller, the blades of the propeller being adjustably mounted whereby the pitch of the propeller blades may be varied, control means extending through the tubular driving member and projecting through the top of the body of the vehicle for adjusting the pitch of the propeller blades, driving means for interconnecting the propeller to said source of power, said driving means including a shaft extending downwardly from the empennage and releasably interconnected to the source of power, guiding ailerons mounted on the empennage on the end opposite the propeller, and guiding means extending from the propeller through the body of the vehicle into reach of the pilot for controlling the ailerons.

23. In a duo-functional vehicle adapted for use either as a ground vehicle having a body terminating in a dome-shaped top portion and having a rear engine drive or as an airplane by removably attaching wings to the body of the ground vehicle having a source of power, the combination including an empennage removably attached to and snugly fitting the dome of the top of the ground vehicle, a propeller mounted at one end of the empennage, a tubular driving member journalled in the empennage for actuating the propeller, the blades of the propeller being adjustably mounted whereby the pitch of the propeller blades may be varied, control means extending through the tubular driving member and projecting through the top of the body of the vehicle for adjusting the pitch of the propeller blades, driving means for interconnecting the driving member to said source of power, said driving means including a shaft extending downwardly from the empennage to the rear of the seating compartment of the ground vehicle and releasably interconnected to the source of power, guiding ailerons mounted on the empennage on the end opposite the propeller, and guiding means extending from the empennage through the body of the vehicle into reach of the pilot for controlling the ailerons.

24. In a duo-functional vehicle adapted for use either as a ground vehicle simulating an automobile having a rear engine drive or as an airplane by removably attaching wings to the body of the ground vehicle, the combination including an empennage removably attached to the top of the ground vehicle, a propeller mounted on one end of the empennage, an elevator mounted on the other end of the empennage, and releasable driving means for interconnecting the propeller to the engine, said driving means projecting downwardly to the rear of the seating compartment of the ground vehicle.

25. In a duo-functional vehicle adapted for use either as a ground vehicle simulating an automobile or as an airplane by removably attaching wings to the body of the ground vehicle having a source of power, the combination including an empennage removably attached to the top of the ground vehicle, a propeller mounted at one end of the empennage, a tubular driving member journalled in the empennage for actuating the propeller, the blades of the propeller being adjustably mounted whereby the pitch of the propeller blades may be varied, control means extending through the tubular driving member and extending into the body of the vehicle so as to be within reach of the pilot for adjusting the pitch of the propeller blades, and driving means for interconnecting the propeller to said source of power, said driving means including a shaft extending downwardly from said empennage and releasably interconnected to said source of power.

26. In a duo-functional vehicle adapted for use either as a ground vehicle simulating a rear engine drive automobile or as an airplane by removably attaching wings to the body of the ground vehicle, the combination including an empennage removably attached to the ground vehicle, a propeller mounted on one end of the empennage, the blades of which are adjustably mounted whereby the pitch of the propeller blades may be varied, control means projecting into the body of the ground vehicle for adjusting the pitch of the propeller blades, driving means journalled in the empennage for actuating the propeller, said driving means extending in parallel relation to the control means within the empennage, and a drive shaft extending from the empennage to the rear of the seating compartment of the ground vehicle and interconnected to the engine for actuating said driving means to thereby drive the propeller.

THEODORE B. HOLLIDAY.